US005861900A

United States Patent [19]

Lu et al.

[11] Patent Number: 5,861,900

[45] Date of Patent: Jan. 19, 1999

[54] INK JET PRINTER WITH CONTROLLED TIME-DELAY BETWEEN APPLICATION OF DIFFERENT TYPES OF LIQUID INKS

[75] Inventors: Kai K. Lu, San Diego; Mark L. Choy, Escondido; Gary W. Byers, Vista; Ronald A. Askeland, San Diego, all of Calif.

[73] Assignee: Hewlett-Packard Company, Palo Alto, Calif.

[21] Appl. No.: 707,538

[22] Filed: Sep. 4, 1996

[51] Int. Cl.[6] .................................. B41J 2/21; B41J 2/01; G01D 11/00

[52] U.S. Cl. ............................. 347/43; 347/100; 347/102

[58] Field of Search .................................. 347/37, 40, 43, 347/100, 9, 102; 400/124.05, 121; 318/646

[56] References Cited

U.S. PATENT DOCUMENTS 4,435,064 3/1984 Tsukada et al. ........................ 347/130
4,940,998 7/1990 Asakawa .................................... 347/37
5,376,958 12/1994 Richtsmeier et al. .................... 347/40

*Primary Examiner*—N. Le
*Assistant Examiner*—Thinh Nguyen

[57] ABSTRACT

The center-to-center spacing of pens containing a "problematic" combination of inks is increased to introduce a relatively small additional time-delay in which those particular constituents are applied to the same or adjacent areas during a single pass, thereby providing a substantial improvement in print qualities (such as Halo or Bleed) on plain (untreated) and special purpose (matt, glossy, transparent) print media, without substantially increasing the throughput rate. The center-to-center spacing of a critical combination of pens is substantially greater than the width of a single pen, thereby providing an increased delay that is equal to the increased spacing divided by the traverse speed. Different delays are provided for different combinations of ink by arranging at least three pens in a fixed sequence with different fixed spacings between different combinations of pens, such that a greater spacing and thus a longer delay is associated with one or more combinations of inks which interact adversely on print quality, and a shorter delay with at least one combination of inks which interacts less adversely on print quality. In particular, if a particular pair of two pens is a "problematic" combination requiring a longer delay and other pairs are "safe" combinations requiring a shorter delay, the pair requiring the longer delay may be held in two non-adjacent compartments, possibly separated by one or more other pens. In one particular example, the order is KMCY, which provides an effective center-to-center spacing of 2 pen widths for the two "problematic" combinations of KC and YM, and a center-to-center spacing of at least 1 pen width for the four safe combinations, thereby providing an economic solution to improve print qualities such as Halo and Bleed by increasing the center-to-center spacing of the pens associated with one or more "problematic" combinations of inks, without any noticeable change in throughput rate.

4 Claims, 4 Drawing Sheets

INK JET PRINTER WITH CONTROLLED TIME-DELAY BETWEEN APPLICATION OF DIFFERENT TYPES OF LIQUID INKS

TECHNICAL FIELD

The present invention relates generally to ink jet printers and more specifically to providing a controlled time delay between application of certain combinations of ink to the same or adjacent locations.

BACKGROUND ART

When more than one type or color of liquid ink is used to print a color image, various print quality issues must be addressed relating to how the different types of ink interact on the print medium. This is particularly the case in ink jet printers in which different types of liquid ink from different "pens" (ink cartridges, nozzles, or other ink delivery devices) are sequentially applied onto the same location or contiguous locations of the print medium during the same traverse of the carriage across the print medium.

Two commonly encountered image defects are "Halo" and "Bleed". A stylized representation of "Halo" is depicted in exaggerated form in FIG. 1, and typically occurs at the boundaries between adjacent colored areas producing a white gleam (H) at the interfaces (I). When Halo occurs, it is believed that the ink shrinks away from the boundary of each region dries, leaving an exposed line of bare print medium in the boundary region.

A stylized representation of "Bleed" is depicted in exaggerated form in FIG. 2, and typically occurs on the edges of lines or boxes, where one color of ink is applied next to another color of ink. When Bleed occurs, it is believed that there is a migration of colorant into adjacent regions causing rough or expanded boundaries (B).

Both problems of Bleed and Halo can be mitigated by increasing the time delay of the deposition between the inks. However, it is not always practical to wait for one type of ink to dry completely before applying another. Not only would such an expedient result in a much longer printing process, it actually can produce other unwanted image artifacts. For example, in a typical ink jet printer, the ink is applied in horizontal swaths; if the ink in one swath is completely dry before the next swath is applied, there will be a noticeable line at the boundary between the two swaths. There are a number of other image quality defects that can be impacted by changes in time-delay such as mottle, gloss uniformity. Moreover, a certain amount of mixing of two different colors is desirable when printing a large area of a secondary color made from more than one color.

By introducing modifications to the colorant and/or by adding or modifying surfactant, penetrant, inorganic ion, polymeric and/or other chemical components of the ink formulation, physical properties (for example, viscosity, surface tension, and boiling point) and chemical properties (for example, film forming ability and binding ability) can be altered to change the chemical interactions within the same type of ink, between the different inks, and between each ink and the underlying media, thereby changing the manner a particular type of ink spreads and interacts with other inks and with the print media. By appropriate manipulation of the compositions of each of two types of ink, it is possible to form a defined boundary free of Halo or Bleed artifacts, as taught for example in U.S. Pat. No. 5,198,023 (Stoffel—Cationic Dyes With Added Multi-Valent Cations To Reduce Bleed In Thermal Ink-Jet Inks) which is hereby incorporated by reference.

However, a typical subtractive color printing process requires not just two, but up to four types of ink (black, cyan, magenta, and yellow), which results in 4×3/2=6 possible pairings (4×3=12, if order is critical), or up to 6+4+1=11 combinations (12+24+24=60 combinations, if order is critical) if more than 2 types are applied to the same location. Thus, ink formulations that rely on composition to produce a desirable interaction between a particular pair of inks may produce an unintended (and unwanted) interaction with other combinations of inks. For example, if the interactions are based on the ionic polarity (+ or −) of polyelectrolytes with two types of ink being cationic (+) and two being anionic (−), four of the six possible pair types will have opposing charges (+− or −+) and a resultant well-defined interface and two will have the same charge (++ or −−) with significant resultant Bleed or Halo. Careful optimization of print medium and surface coatings interacting with the inks will typically produce a substantial improvement to image quality; however, use of special purpose print media materially adds to the cost per page and is therefore not practical for many applications. Moreover, specially formulated inks and print media typically require modification of other printing variables such as nozzle temperature, firing energy, drying time and temperature, with the result that the reformulated materials may not be suitable for use with existing printers.

Providing a heater or increasing the power of an existing heater can increase the ink drying rate and decrease the mobility of the ink, thus lessening the propensity for Halo and Bleed effects; however, excessive heater power can cause dry cockle, paper browning and paper curl. Moreover, heaters are not practical in energy sensitive portable printers and in ink jet printers designed for office use the heater power is already set to a practical maximum in order to maximize throughput.

DISCLOSURE OF INVENTION

The present invention increases the center-to-center spacing of pens containing a "problematic" combination of inks, to introduce a relatively small additional time-delay in which those particular constituents are applied to the same or adjacent areas during a single pass, thereby providing a substantial improvement in print qualities (such as Halo or Bleed) on plain (untreated) and special purpose (matt, glossy, transparent) print media, without substantially increasing the throughput rate.

In accordance with one aspect of the invention, the center-to-center spacing of a critical combination of pens is substantially greater than the width of a single pen, thereby providing an increased delay that is equal to the increased spacing divided by the traverse speed. The increased delay is preferably less than the time required to print a single swath with a single type of ink, and may include a component resulting from a reduced traverse speed that is used only when the two types of ink are being applied in the same traverse of a high quality multiple color image.

In accordance with another aspect of the invention, different delays are provided for different combinations of ink by arranging at least three pens in a fixed sequence with different fixed spacings between different combinations of pens, such that a greater spacing and thus a longer delay is associated with one or more combinations of inks which interact adversely on print quality, and a shorter delay with at least one combination of inks which interacts less adversely on print quality. In particular, if a particular pair of two pens is a "problematic" combination requiring a longer delay to reduce visible occurrences of a particular defect phenomenon, and other pairs are "safe" combinations that can accommodate a shorter delay without visable defects, the pair requiring the longer delay may be held in two non-adjacent compartments, possibly separated by one or more other pens.

BRIEF DESCRIPTION OF DRAWINGS

FIG. 3 comprising

PREFERRED MODE FOR PRACTICING THE INVENTION

The operation of the invention has been experimentally verified with a test bed inkjet printer that has a user controllable traverse speed, but that is otherwise conventional in construction and operation, and using commercially available printing media.

The inks selected for the test were experimental pigment-based inks. Two types of ink (Y=yellow & M=magenta) contained a positively charged polyelectrolyte and two other inks (C=cyan & K=black) contained a negatively charged polyelectrolyte. The resultant ionic forces tended to maintain dispersion within a single type of ink and tended to cause a precipitate to form a well-defined border between two types of inking having opposite charges. Thus, four of the possible six pairings of ink types did not demonstrate pronounced Halo or Bleed. The cyan and black combination (CK), which had the same (negative) polyelectrolyte charge and which are both darker than most paper media, had a pronounced tendency to exhibit Halo effects and also exhibited visible Bleed. Although the magenta and yellow combination (MY) also had the same (positive) polyelectrolyte charge, it exhibited less visible Halo than the CK combination (presumably because of the relatively low contrast between the yellow ink and the usual white or off-white print media). Both combinations (CK & MY) did have a tendency to produce visible Bleed; with the Halo produced by the C K combination being somewhat more pronounced than the Bleed produced by the MY combination. In this example, combinations of inks having little or no visible tendency to Bleed or form Halos at their common boundary are "safe" combinations, while those having a pronounced tendency to exhibit readily apparent Bleed or Halos at the border are "problematic". See Table 1.

TABLE 1

Problematic (P) and Safe Combinations (S)

| | Y(+) | M(+) | C(−) | K(−) |
|---|---|---|---|---|
| Y(+) | ////// | | | |
| M(+) | P | ////// | | |
| C(−) | S | S | ////// | |
| K(−) | S | S | P | ////// |

Figure 1:
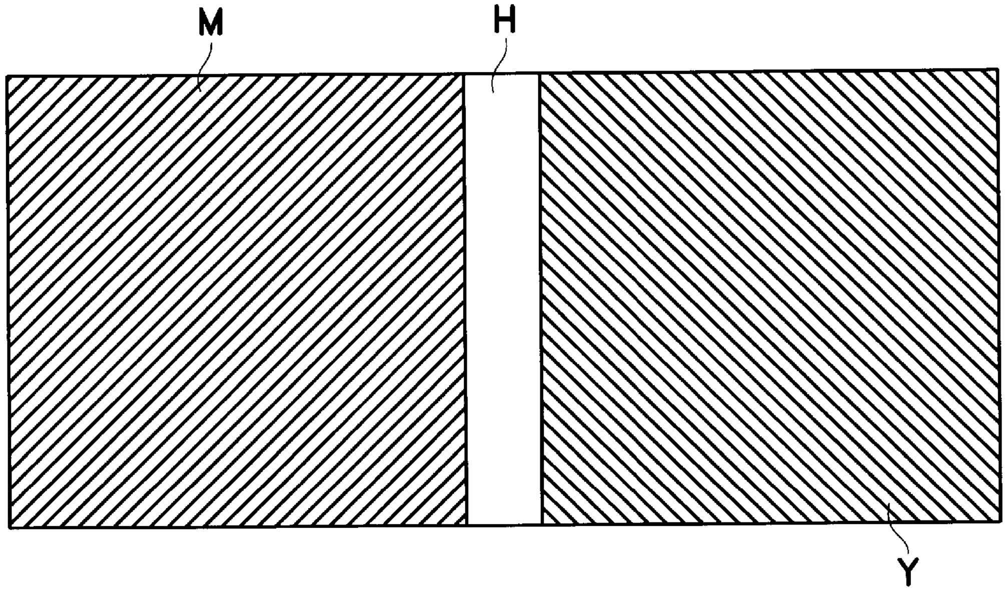
FIG. 1 is a stylized representation of an enlarged portion of an image in which the "Halo" effect can be seen between two adjacent regions printed with dissimilar types of ink.
Figure 2:
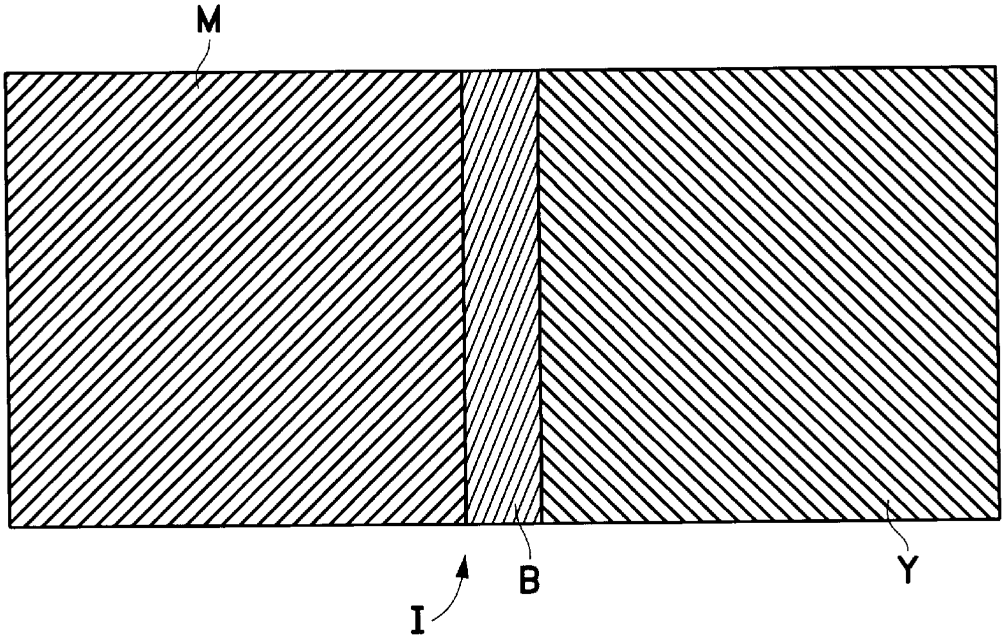
FIG. 2 is a stylized representation of an enlarged portion of an image in which the "Bleed" effect can be seen between two adjacent regions printed with similar types of ink.
Figure 3A:
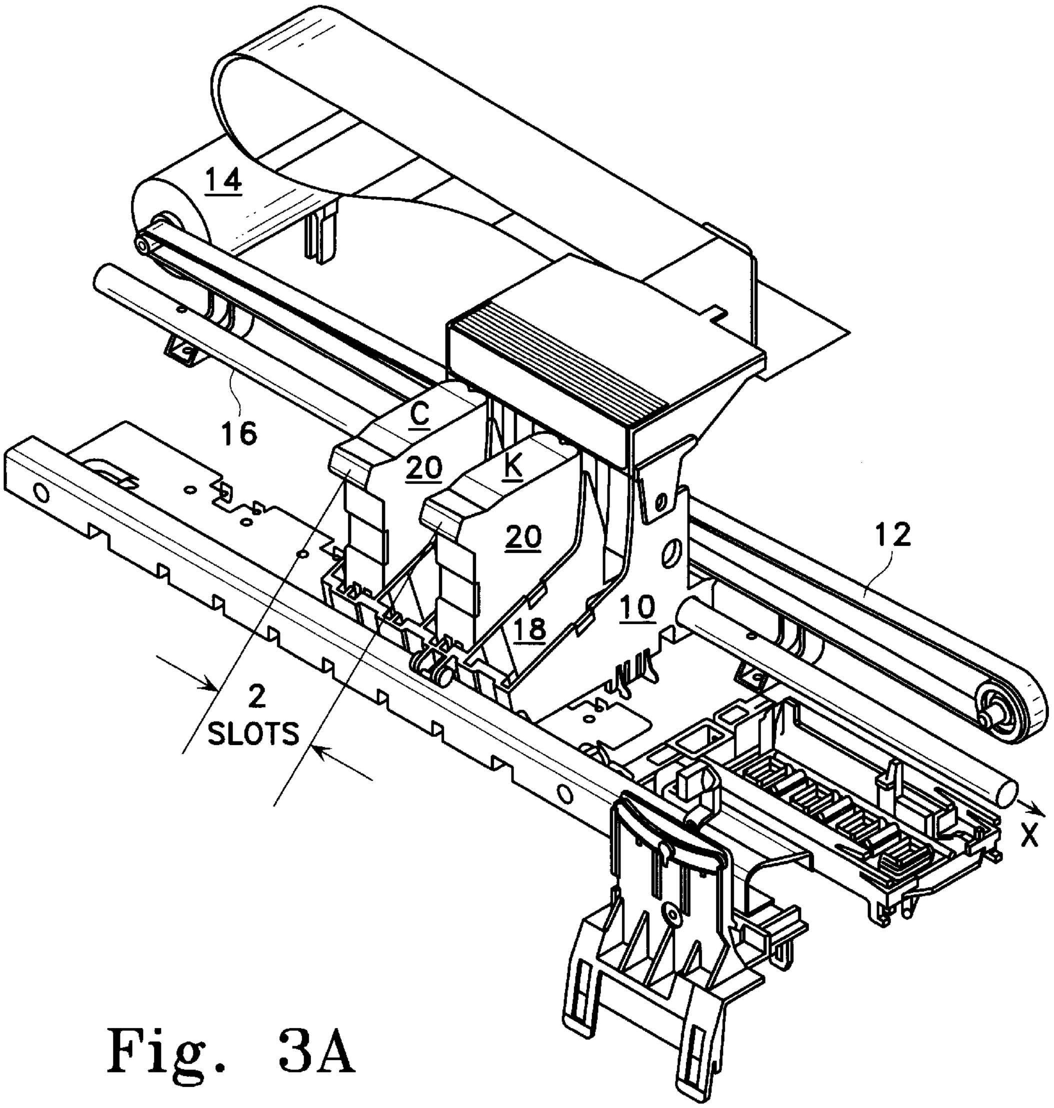
FIGS. 3A and 3B shows how the center-to-center spacing of a particular "problematic" combination of pens may be varied to measure variations in print quality.
Figure 3B:
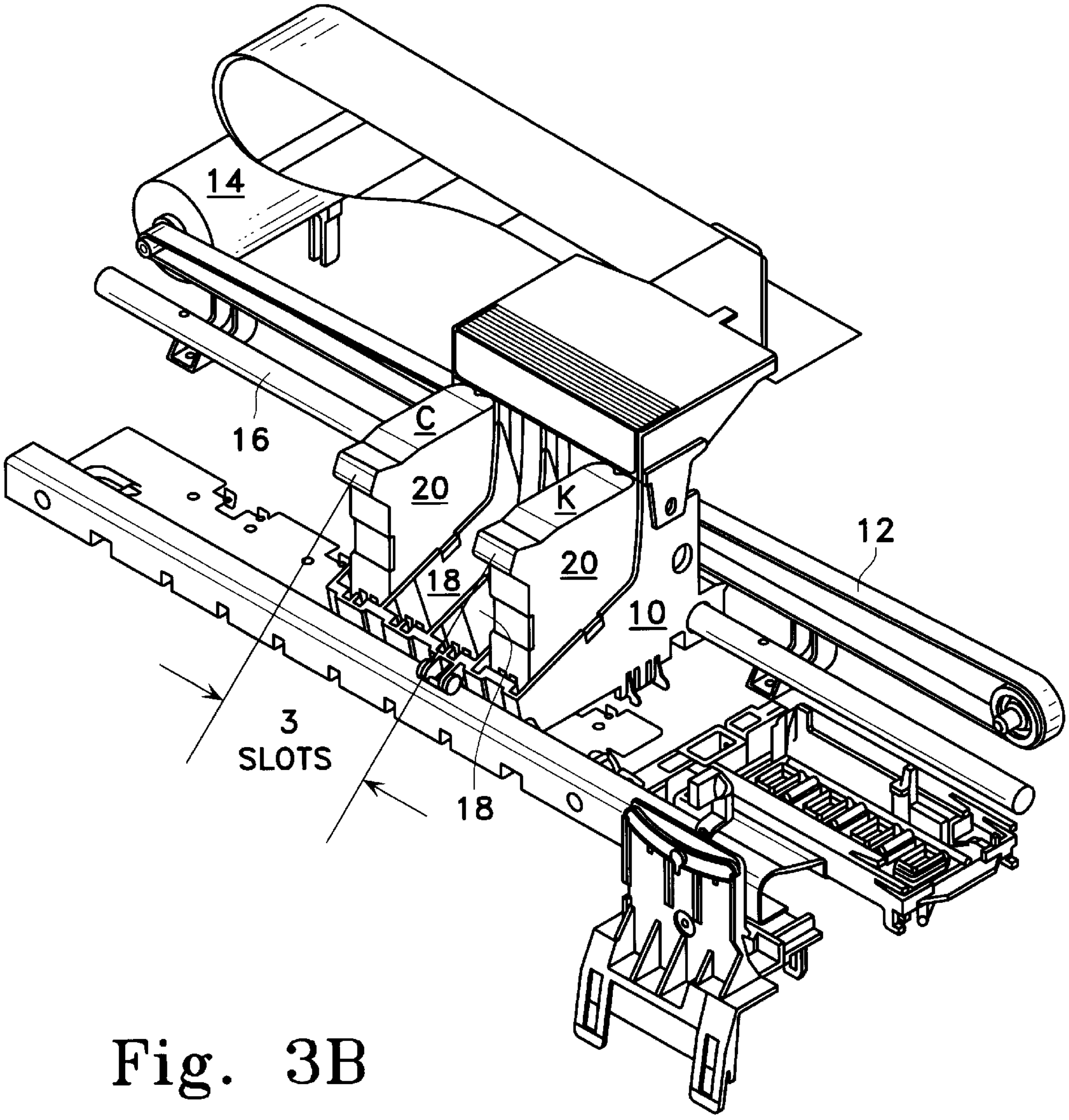
Figure 4:
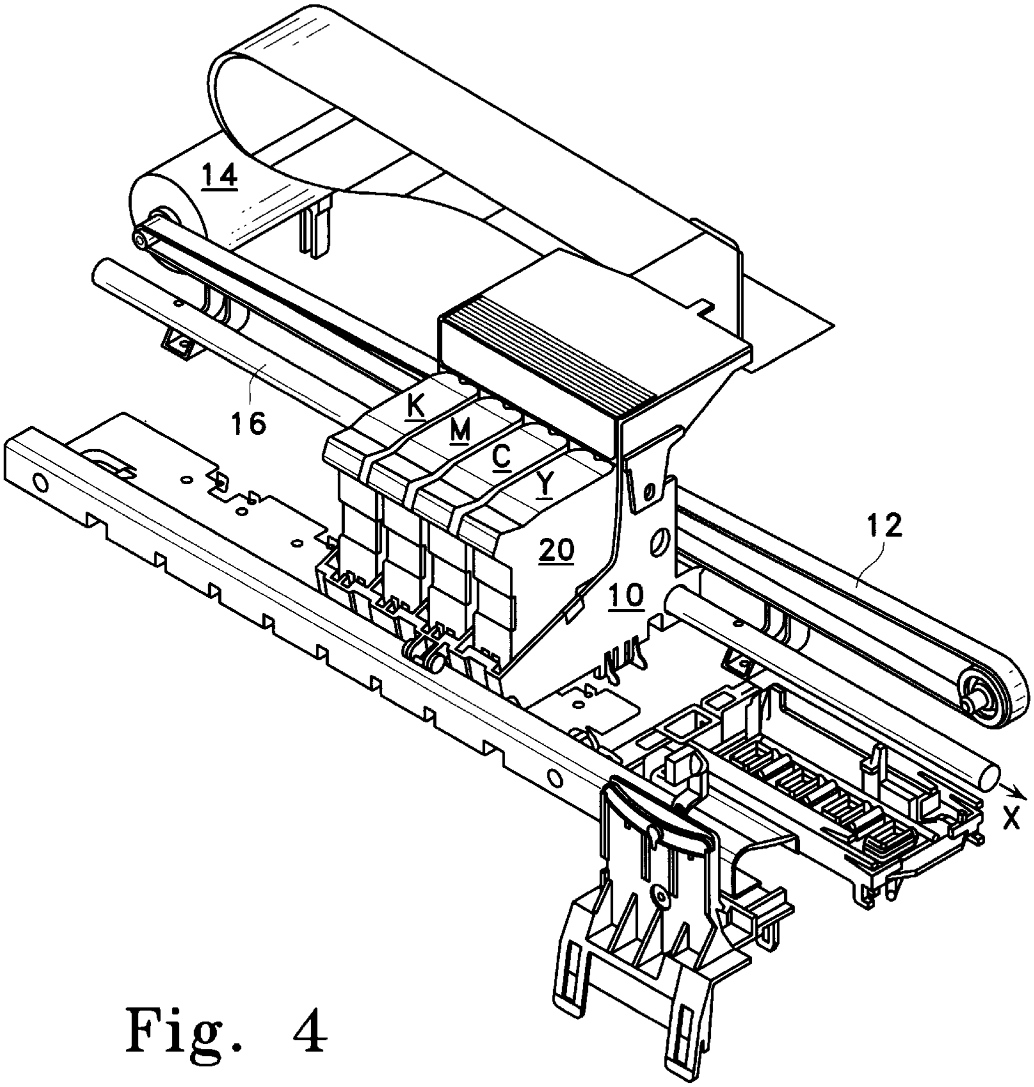
FIG. 4 shows a preferred arrangement of four pens in four compartments, which takes into account which combinations of inks are "safe" and which are "problematic".

The test bed printer was a Hewlett Packard brand DeskJet 1200C inkjet printer with modified software drivers and mechanical components to provide a variable printing speed, and as shown in FIGS. 3A and 3B, includes a carriage 10 driven by a belt 12 and a motor 14 along a rail 16 defining a traverse axis X. The carriage 10 includes four compartments 18 for receiving four respective pens 20. The center-to-center spacing ("slot distance") of the individual cartridges ("pens") in the unmodified pen holder ("carriage") and the native pen-order (YMCK) of the DeskJet 1200C were the default settings. Other pen orders and/or an increased spacing between a particular combination of pens was obtained by manually switching or removing certain pen(s) from the pen holder. FIG. 3A shows two installed cartridges C having a slot spacing of 2 slots, while FIG. 3B shows a slot spacing of 3 slots. Time-delay between pen slots was calculated by the nominal printing speed (ips, inch per second) and a standard slot-distance of 0.875 inch (see Table 2).

TABLE 2

Calculated time-delays at specific printing speeds and center-to-center spacings

| | Time-delays (milliseconds) | | |
|---|---|---|---|
| Transverse Speed | 1 Slot | 2 Slot | 3 Slot |
| 7 ips | 125 | 250 | 375 |
| 10 ips | 87.5 | 175 | 262.5 |
| 20 ips | 43.75 | 87.5 | 131.25 |

Relative scoring (e.g., 1–10, 10 is the best) was assigned for both Halo and Bleed from adjacent area fills of black and cyan. A score 6 or above is visually acceptable for Halo, while a score of (8) or above is visually acceptable for Bleed. Table 3 sets forth examples of the results to show the potential improvement of print qualities possible with this invention.

TABLE 3

Printing time-delays vs. Relative unheated Halo and (Bleed) scores

| Time Delay | Relative score (1–10, 10 is the best). | | | | |
|---|---|---|---|---|---|
| (ms) | ZWK | CDC | Multi | LASER | ARRM |
| 43.75 | 3 (3) | 3 (3) | 2 (9) | 1 (8) | 2 (5) |
| 87.5 | 4 (4) | 4 (4) | 2 (9) | 3 (9) | 2 (5) |
| 125 | 5 (5) | 5 (5) | 4 (9) | 3 (9) | 4 (7) |
| 131.25 | 5 (4) | 5 (4) | 4 (9) | 3 (9) | 4 (6) |
| 175 | 6 (6) | 6 (6) | 6 (9) | 5 (9) | 5 (8) |

TABLE 3-continued

Printing time-delays vs. Relative unheated Halo and (Bleed) scores

| Time Delay (ms) | Relative score (1–10, 10 is the best). ZWK | CDC | Multi | LASER | ARRM |
|---|---|---|---|---|---|
| 250 | 7 (6) | 7 (7) | 7 (10) | 6 (9) | 6 (9) |
| 262.5 | 6 (7) | 6 (9) | 6 (10) | 5 (9) | 5 (9) |
| 375 | 7 (8) | 7 (7) | 7 (10) | 6 (10) | 6 (9) |

The slight worsening of some of the test scores from 125 to 131.25 and from 250 to 262.50 is believed to be the result of deviations in visual evaluation of samples with respect to Bleed and Halo.

The tests were performed on a variety of commercially available plain paper media, including:

| | |
|---|---|
| CDC | Champion Datacopy |
| LASER | Karelia Laser |
| ZWK | ZweckForm |
| Multi | Stora Papyrus Multicopy |
| ARRM | Aussedat-Rey Reymat |

The effective time delay (T) between the application of the two types of inks from different pens is given by the following equation $$T=SN$$

in which V is the instantaneous traverse speed of the carriage, S is the center-to-center spacing of the relevant pens.

From Table 3 it appears that acceptable print quality is obtained on "Multi" print media with a sequential delay of 175 ms. Accordingly, if the spacing is 0.875" (1 slot width) then the maximum permissible traverse speed is $$V_{max}=0.875/0.250=5.00 \text{ ips}$$

Assuming that the printer is capable of printing high quality graphics in single color mode at 10.0 ips this in effect means that the throughput has been reduced by a factor of two, which is probably offset by the elimination of the additional passes that would otherwise be required for a conventional high quality full color mode, However, if the spacing is increased to 2 slot widths, then the maximum permissible traverse speed is $$V_{max}=1.750/0.175=10.0 \text{ ips}$$

with the result that a high quality full color print mode with acceptable print quality is possible at approximately twice the throughput rate for the same print quality that would conventionally be obtainable only with half the traverse speed or with one or more additional traverses over the same swath.

T may be determined experimentally for other combinations, using the procedures described above.

In a commercial embodiment, rather than merely slow down the carriage during the application of a problematic combination of inks and/or print media (which will slow down throughput for printing) or make additional traverses of the carriage for each swath containing a problematic combination (which will result in a minimum delay at least equal to the time required to print additional swath(s) thereby sacrificing throughput) it is contemplated that the center-to center spacing will be greater for a problematic combination than for a safe combination.

Moreover, if during a particular pass the two ink pens then in use are already separated by a third pen, the effective spacing has already been increased by the space occupied by the third pen, which will diminish, or perhaps altogether avoid, any reduction in carriage speed that would otherwise be required to increase the effective delay between the application of the two respective types of ink.

Thus, in accordance with another aspect of the present invention, the individual pens are arranged on the carriage to achieve maximum separation of one or more problematic combinations of inks.

In the particular example shown in FIG. 3, the order is KMCY, which provides an effective center-to-center spacing of 2 pen widths for the two "problematic" combinations of KC and YM, and a center-to-center spacing of at least 1 pen width for the four safe combinations, and which for most applications having two problematic combinations and four safe combinations is considered optimal. Note that the space between each pair of pens of a given type is occupied by a pen of the other type, thereby providing the desired increased spacing for the problematic combinations, without any increase in the total width of the carriage or in the footprint of the printer. Alternatively, the less than optimal order KMYC provides a maximum delay (3 pen widths) between the most critical problematic combination KC associated with the most visible artifacts (in which any Halo is more pronounced because of the high perceived contrast with the white to ivory color of typical print media, and in which any Bleed is more pronounced because of the high difference in perceived intensity of the two colors), and only a minimal delay (1 pen width) between the less critical (but still problematic) combination of magenta and yellow. What superficially appears to be a minor deviation from convention (KMCY or KMYC instead of YMCK) in effect doubles or even triples the delay between the two components of the most problematic combination, resulting in a substantial improvement in print quality without any sacrifice of throughput. Alternatively, the carriage traverse speed may be increased by a factor of two or even three without adversely affecting Bleed or Halo.

Accordingly, the present invention provides an economic solution to improve print qualities such as Halo and Bleed by increasing the center-to-center spacing of the pens associated with one or more problematic or critical combinations of inks, thereby providing a relatively small increase in the time-delays between applying those combinations of inks, that is significantly less than the time required for a second traverse of the same area, but that is still sufficient to provide a noticeable improvement in print quality without any noticeable change in throughput rate.

It should be understood that the present invention is not limited to single pass printing modes. In particular, it is equally applicable to multi-pass printing modes in which more than one color of ink is being applied during the same traverse of the carriage across the print medium, but in which successive swaths overlap or are interlaced (for example, to reduce visible lines between successive swaths) or in which the same region and/or is covered by more than one swath (for example, to produce a more saturated image).

What is claimed is:

1. A method for improving print quality in an ink jet printer of the type wherein a carriage traverses along a traverse axis to apply at least two types of inks from a respective one of two pens during a single traverse across a print medium, said method comprising the steps of:

determining a required time delay between applying the two types of inks to adjoining locations on the print medium with the two types of inks, said required time delay being less than a time required to print a single swath of only one type of ink during a single said traverse, said two types of ink being a problematic combination of inks producing visible boundary defects if said required time delay is not maintained;

providing said carriage with a print cartridge holder having at least two compartments; installing each of said two pens in a respective one of said two compartments; spacing the two compartments by a predetermined center-to-center spacing equal to at least twice a width of one of said pens;

traversing said carriage across the print medium at a speed not greater than said predetermined spacing divided by said required time delay, and applying the two types of ink to adjoining locations on the print medium from the two pens in the two compartments during a single traverse of the carriage, whereby when said carriage traverses across the print medium at said predetermined speed and said pens are separated by said predetermined spacing, said two types of inks are sequentially applied to said adjoining locations of the print medium with said required time delay.

2. Ink jet printer apparatus of the type wherein a carriage traverses along a traverse axis to sequentially apply at least three types of ink to a same or an adjoining location of a print medium during a single traverse across a print medium, said apparatus comprising:

a carriage having at least three pen compartments sequentially arranged along a traverse axis, including a first compartment and a third compartment separated by a second compartment; and at least three pens, including a first pen in said first compartment, a second pen in said second compartment, and a third pen in said third compartment;

wherein the first and third pens are separated by a first predetermined center-to-center spacing, the second pen is separated from the first and third pens by at least a second center-to-center spacing substantially less than the first predetermined center-to-center spacing, the first and third pens contain respective types of ink that require an associated first time delay between application of the two types of ink to adjoining locations of the print medium in order to provide a well-defined border between the two types free from excessive Bleed or Halo, a second time delay substantially less than said first time delay is required between applications of the second type of ink and either the first or third type; and the carriage traverses across the print medium with a traverse speed that is substantially equal to the lessor of the first center-to-center spacing divided by the first time delay and the second center-to-center spacing divided by the second time delay.

3. Ink jet printer apparatus of the type wherein a carriage traverses along a traverse axis to sequentially apply at least four types of inks to a same or adjoining locations of a print medium during a single traverse across a print medium, said apparatus comprising:

a carriage having a first pen compartment, a second pen compartment, a third pen compartment, and a fourth pen compartment sequentially arranged along a traverse access, with a predetermined center-to-center spacing between two adjacent said pen compartments, and at least four pens, including a first pen with a first ink including a negatively charged polyelectrolyte in said first compartment, a second pen with a second ink including a positively charged polyelectrolyte in said second compartment, a third pen with a third ink including a negatively charged polyelectrolyte in said third compartment, and a fourth pen with a fourth ink including a positively charged polyelectrolyte in said fourth compartment;

wherein the first and third pens require at least a first predetermined time delay between application of the two types of ink with the negatively charged polyelectrolyte to adjoining locations of the print medium in order to provide a well-defined border between the two types free from excessive Bleed or Halo;

the first and third pens are separated by a center-to-center spacing equal to at least two times said predetermined center-to-center spacing;

the second and fourth pens also require at least said first predetermined first time delay between application of the two types of ink with the positively charged polyelectrolyte to adjoining locations of the print medium in order to provide a well-defined border between the two types free from excessive Bleed or Halo;

the second and fourth pens are separated by a center-to-center spacing equal to at least two times said predetermined center-to-center spacing;

a second time delay less than said first time delay is required between applications of one of the inks with the negatively changed polyelectrolyte and one of the inks with the positively charged polyelectrolyte; and the carriage traverses across the print medium with a traverse speed that is substantially equal to the lessor of (a) two times said predetermined center-to-center spacing divided by the first time delay and (b) said predetermined center-to-center spacing divided by the second time delay.

4. Ink jet printer apparatus of the type wherein a carriage traverses along a traverse axis to sequentially apply at least four types of inks to a same or adjoining locations of a print medium during a single traverse across a print medium, said apparatus comprising:

a carriage having a first pen compartment, a second pen compartment, a third pen compartment, and a fourth pen compartment sequentially arranged along a traverse access, with a predetermined center-to-center spacing between two adjacent said pen compartments, and at least four pens, including a first pen with a colored ink including a first type of charged polyelectrolyte in said first compartment, second and third pens with respective second and third colored inks each including a second type of charged polyelectrolyte in said second and third compartments, and a third pen with a black ink including the first type of charged polyelectrolyte in said fourth compartment, wherein the first and fourth pens require at least a first time delay between application of the two types of ink with the first type of charged polyelectrolyte to adjoining locations of the print medium in order to provide a well-defined border between the two types free from excessive Bleed or Halo;

the first and fourth pens are separated by a center-to-center spacing equal to at least three times said predetermined center-to-cent spacing;

the second and third pens require only a second time delay substantially less than said first predetermined time delay between application of the two types of ink with the second type of charged polyelectrolyte to adjoining locations of the print medium in order to provide a well-defined border between the two types free from excessive Bleed or Halo; and the carriage traverses across the print medium with a traverse speed that is substantially equal to the lessor of (a) three times said predetermined center-to-center spacing divided by the first time delay and (b) said predetermined center-to-center spacing divided by the second time delay.

* * * * *

UNITED STATES PATENT AND TRADEMARK OFFICE

CERTIFICATE OF CORRECTION

PATENT NO. : 5,861,900

DATED : January 19, 1999

INVENTOR(S) : Iu et al.

It is certified that error appears in the above-identified patent and that said Letters Patent is hereby corrected as shown below:

On the title page,Item[75] Inventors, delete "Lu" and insert in lieu thereof --Iu--.

Signed and Sealed this

First Day of June, 1999

Attest:

Q. TODD DICKINSON

*Attesting Officer* *Acting Commissioner of Patents and Trademarks*